United States Patent
Kambara et al.

(10) Patent No.: US 10,065,170 B2
(45) Date of Patent: Sep. 4, 2018

(54) HYDROGEN GENERATING APPARATUS AND FUEL CELL SYSTEM PROVIDED WITH HYDROGEN GENERATING APPARATUS

(71) Applicants: GIFU UNIVERSITY, Gifu (JP); SAWAFUJI ELECTRIC CO., LTD., Gunma (JP); ACTREE CORPORATION, Ishikawa (JP)

(72) Inventors: Shinji Kambara, Gifu (JP); Tomonori Miura, Gunma (JP); Megumi Masui, Ishikawa (JP)

(73) Assignees: GIFU UNIVERSITY, Gifu (JP); SAWAFUJI ELECTRIC CO., LTD., Gunma (JP); ACTREE CORPORATION, Ishikawa (JP)

(*) Notice: Subject to any disclaimer, the term of this patent is extended or adjusted under 35 U.S.C. 154(b) by 413 days.

(21) Appl. No.: 14/432,699

(22) PCT Filed: Oct. 1, 2013

(86) PCT No.: PCT/JP2013/005850
§ 371 (c)(1),
(2) Date: Mar. 31, 2015

(87) PCT Pub. No.: WO2014/054277
PCT Pub. Date: Apr. 10, 2014

(65) Prior Publication Data
US 2015/0238922 A1    Aug. 27, 2015

(30) Foreign Application Priority Data
Oct. 2, 2012   (JP) .................................. 2012-220194

(51) Int. Cl.
*B01J 19/18* (2006.01)
*H01M 8/06* (2016.01)
(Continued)

(52) U.S. Cl.
CPC ............. *B01J 19/088* (2013.01); *C01B 3/047* (2013.01); *C01B 3/503* (2013.01);
(Continued)

(58) Field of Classification Search
CPC ............. B01J 19/088; B01J 2219/0809; B01J 2219/0815; H01M 8/0687; H01M 8/0606;
(Continued)

(56) References Cited

U.S. PATENT DOCUMENTS 7,037,484 B1 * 5/2006 Brandenburg ......... B01J 19/088
                                                             204/157.52
8,202,500 B2   6/2012 Fahs, II et al.
(Continued)

FOREIGN PATENT DOCUMENTS

CN    100532249    8/2009
JP    2001283885   10/2001
(Continued)

OTHER PUBLICATIONS

Machine translation of JP2004-359508, Dec. 2004.*
(Continued)

*Primary Examiner* — Lisa S Park
(74) *Attorney, Agent, or Firm* — Trego, Hines & Ladenheim, PLLC (57) ABSTRACT

To provide a hydrogen generating apparatus that efficiently generates hydrogen from ammonia, and a fuel cell system that generates power using the efficiently generated hydrogen. [Solution] A hydrogen generating apparatus (1) is provided with a plasma reactor (3), a high-voltage electrode (5), a grounding electrode (7), and a gas supply means (15) that supplies a gas containing ammonia to the plasma reactor. The high-voltage electrode (5) is configured with a hydrogen separation membrane (12) included therein. Under the conditions of room temperature and atmospheric pres-
(Continued)

sure, the hydrogen separation membrane (12) of the high-voltage electrode (5) discharges electricity between the grounding electrode (7) and the hydrogen separation membrane with power supplied from a high-voltage pulse power supply (2), and hydrogen is generated by bringing into the plasma state the ammonia contained in the gas thus supplied.

4 Claims, 5 Drawing Sheets

(51) Int. Cl.

| | | |
|---|---|---|
| *B01J 19/08* | (2006.01) | |
| *C01B 3/04* | (2006.01) | |
| *C01B 3/50* | (2006.01) | |
| *H01M 8/0606* | (2016.01) | |
| *H01M 8/0662* | (2016.01) | |
| *B01D 53/22* | (2006.01) | |

(52) U.S. Cl.
CPC ....... *H01M 8/0606* (2013.01); *H01M 8/0687* (2013.01); *B01D 53/22* (2013.01); *B01D 2256/16* (2013.01); *B01J 2219/0809* (2013.01); *B01J 2219/0815* (2013.01); *H01M 2250/20* (2013.01); *Y02E 60/364* (2013.01); *Y02T 90/32* (2013.01)

(58) Field of Classification Search
CPC .... H01M 2250/20; C01B 3/503; C01B 3/047; Y02T 90/32; B01D 2256/16; B01D 53/22; Y02E 60/364
See application file for complete search history.

(56) References Cited

U.S. PATENT DOCUMENTS

| 8,440,154 B2 | 5/2013 | Fahs, II et al. | |
|---|---|---|---|
| 2005/0026007 A1* | 2/2005 | Herman | H01M 8/04201 |
| | | | 429/411 |

FOREIGN PATENT DOCUMENTS

| JP | 2004359508 | 12/2004 |
|---|---|---|
| JP | 2005285626 | 10/2005 |
| JP | 2011078876 | 4/2011 |
| WO | 2006120860 | 11/2006 |

OTHER PUBLICATIONS

Liu, Chunyang, Liquid Electrode Plasma Ammonia Decomposition Reactor, Sep. 18, 2006, Dalian University of Technology, Liaoning, China.

International Search Report for PCT/JP2012/005850, dated Nov. 25, 2013, JPO.

Kambara, Shinji et al., "Non-Catalytic Hydrogen Production from Ammonia by Pulsed Plasma", Nov. 16, 2012, The Japan Society of Mechanical Engineers Netsukugaku Conference Koen Ronbunshu.

* cited by examiner

HYDROGEN GENERATING APPARATUS AND FUEL CELL SYSTEM PROVIDED WITH HYDROGEN GENERATING APPARATUS

TECHNICAL FIELD

The invention relate to a hydrogen generating apparatus and a fuel cell system wherein the hydrogen generating apparatus is provided, more particularly to an apparatus that efficiently produces hydrogen from ammonia at room temperature and normal pressure.

BACKGROUND ART

Hydrogen, which generates water when burnt, is not a greenhouse gas emitter unlike fossil fuels. Hydrogen thus regarded as a source of clean energy is desirably used in more diverse applications. On the other hand, hydrogen is difficult to liquefy kind easy to react with metals. Further, hydrogen is likely to initiate explosive reactions when muted with oxygen. These properties of hydrogen are associated with difficulties in storage and transportation. These drawbacks of hydrogen are raising the need for a technology that advantageously allows for storage of substances high in hydrogen content as hydrogen carriers, and extraction of hydrogen from the carries right before being used as an energy source.

Examples of the known hydrogen carriers are ammonia and hydrocarbon-based fuels. The patent document 1 describes a technology, wherein hydrogen is produced from ammonia at 400° C. or higher temperatures by using a decomposer and a noble metal catalyst such as Pt, Rh, Pd, or Ru. The patent document 2 describes a technology, wherein hydrogen is produced from ammonia gas decomposed at temperatures between 800° C. and 900° C. by using a nickel/alumina catalyst. The patent document 3 describes a technology, wherein hydrogen is produced from ammonia decomposed at temperatures between 540° C. and 630° C. by using a catalyst containing an aluminum-cobalt oxide.

In the methods conventionally employed to produce ammonia-derived hydrogen, ammonia is reacted at 400° C. or higher temperatures by using various catalysts. These methods, however, necessitate the use of expensive catalysts and high-temperature heat sources, requiring large cost to produce hydrogen. Another problem with these methods is ammonia residue. Due to such problems of the conventional methods, an advantageous technology has been sought to produce hydrogen more efficiently with lower cost in a stable manner.

PRIOR ART DOCUMENTS

Patent Documents

Patent Document 1: Japanese Laid-Open Patent Application No. 2003-40602 A
Patent Document 2: Japanese Laid-Open Patent Application No. 2005-145748 A
Patent Document 3: Japanese Laid-Open Patent Application No. 2012-71291 A

SUMMARY OF THE INVENTION

Problems to be Solved by the Invention

To solve the problems, the invention has an object to provide a hydrogen generating apparatus that efficiently generates hydrogen from ammonia. The invention has another object to provide a fuel cell system that generates power by using efficiently generated hydrogen.

Solutions to the Problems

The invention provides a hydrogen generating apparatus for generating hydrogen from ammonia. The hydrogen generating apparatus according to the invention includes: a plasma reactor; a high-voltage electrode located on an inner side of the plasma reactor and connected to a high-voltage pulse power supply; grounding electrode located at a position on an outer side of the plasma reactor in a manner that faces the high-voltage electrode; and a gas supply unit for supplying an ammonia-containing gas to the plasma reactor. The high-voltage electrode includes a hydrogen separation membrane. In the hydrogen generating apparatus according to the invention, the high-voltage electrode discharges electricity between and the grounding electrode with power supplied from the high-voltage pulse power supply, and the electric discharge induces ammonia, which is contained in the gas supplied from the gas supply unit, to transform into plasma. Then, hydrogen radicals in the plasma are recombined to generate hydrogen.

The inventors' finding is that electric discharge enables transformation of ammonia into plasma at room temperature and atmospheric pressure, which led the inventors to the invention described herein. The ammonia plasma is decomposed into hydrogen radicals and nitrogen radicals, and the hydrogen radicals are recombined to generate hydrogen. On the other hand, the hydrogen radicals and nitrogen radicals are possibly recombined to regenerate at ammonia at a certain ratio. In the hydrogen producing apparatus according to the invention, the hydrogen separation membrane of the high-voltage electrode can immediately separate the generated hydrogen, thereby practically eliminating the chance of ammonia being regenerated. This apparatus thus advantageous can efficiently extract hydrogen.

In the hydrogen generating apparatus according to the invention, preferably, the plasma reactor has a cylindrical shape, and the high-voltage electrode includes as hydrogen separation membrane having a cylindrical shape and concentrically located in the plasma reactor. As a result of these configurations, the hydrogen generating apparatus according to the invention has a discharge space formed between the plasma reactor and the hydrogen separation membrane, and an internal chamber formed on the inner side of the hydrogen separation membrane. The gas supply unit is connected to the discharge space between the plasma reactor and the hydrogen separation membrane to supply the ammonia-containing gas thereto. The hydrogen separation membrane, with power supplied from the high-voltage pulse power supply, can function as a high-voltage electrode with power, discharging electricity between the hydrogen separation membrane and the grounding electrode. This electric discharge induces ammonia to transform into plasma in the discharge space, and hydrogen is thereby generated. The hydrogen separation membrane transmits therethrough the generated hydrogen and guides the hydrogen into the internal chamber.

The invention further provides a fuel cell system provided with a fuel cell and a hydrogen generating apparatus. The hydrogen generating apparatus of the fuel cell system according to the invention includes a plasma reactor, a high-voltage electrode, a grounding electrode, a gas supply unit, and a hydrogen flow channel. The high-voltage electrode includes a hydrogen separation membrane located on the inner side of the plasma reactor and thereby forms an internal chamber. The hydrogen separation membrane is connected to a high-voltage pulse power supply. The grounding electrode is located at a position on the outer side of the plasma reactor in a manner that faces the hydrogen separation membrane. The gas supply unit supplies an ammonia-containing gas into a discharge space between the plasma reactor and the hydrogen separation membrane. The hydrogen flow channel is connected to the internal chamber formed by the hydrogen separation membrane. In the fuel cell system according to the invention, electric discharge between the high-voltage electrode and the grounding electrode induces ammonia, which is contained in the gas supplied from the gas supply unit, to transform into plasma in the discharge space, and hydrogen is thereby generated. The hydrogen separation membrane transmits therethrough the hydrogen generated in the discharge space and guides the hydrogen into the internal chamber. Through the hydrogen flow channel, the hydrogen guided into the internal chamber is supplied to the fuel cell.

Preferably, the fuel cell system according to the invention includes an off gas guiding channel through which hydrogen off gas discharged from the fuel cell is guided into the plasma reactor. Of the contents of the hydrogen off gas guided into the plasma reactor, the hydrogen separation membrane of the hydrogen generating apparatus allows hydrogen alone to transmit therethrough, and then guides the hydrogen into the internal chamber. According to the invention, the hydrogen can be separated from the hydrogen of gas and then supplied to the fuel cell. Thus, the system advantageously enables recycling of the hydrogen off gas.

Effects of the Invention

As described so far in detail, the hydrogen generating apparatus according to the invention can continuously generate hydrogen from ammonia at room temperature and normal pressure (atmospheric pressure).

It normally requires temperatures between 400° C. and 500° C. to separate hydrogen through the hydrogen separation membrane. The plasma reactor according to the invention, on the other hand, can separate hydrogen at high electron temperatures of the plasma. Therefore, hydrogen is separable without applying 400° C.-500° C. heat from outside of the plasma reactor.

The hydrogen generating apparatus according to the invention does not demand the use of any expensive catalysts to generate hydrogen. Such an apparatus can be inexpensively structured as compared to the prior art, and the hydrogen can accordingly be produced with lower cost. Further, this apparatus, wherein hydrogen is generated from ammonia transformed into plasma by electric discharge, can generate hydrogen at higher rates than generating hydrogen through catalytic reactions.

The hydrogen generating apparatus according to the invention is advantageous in that, by optimizing the voltage applied to the high-voltage electrode and the flow rate of ammonia, hydrogen contained in the source material, ammonia, is 100% extractable in the form of hydrogen gas. By virtue of this advantage, this apparatus can very efficiently produce hydrogen and dispense with an additional process for ammonia residue.

The fuel cell system according to the invention, to which hydrogen is supplied more efficiently and inexpensively than the prior art, can generate power with lower cost. The fuel cell system according to the invention reprocesses the hydrogen of gas generated in the fuel cell by using the hydrogen generating apparatus, and then supplies hydrogen separated from the hydrogen off gas back to the fuel cell. Thus, this system advantageously enables recycling of the hydrogen off gas.

EMBODIMENT OF THE INVENTION

A preferred embodiment of the invention is hereinafter described.

1) A plasma reactor according to this embodiment is an atmospheric non-equilibrium plasma reactor, wherein gaseous ammonia can be transformed into atmospheric non-equilibrium plasma at room temperature and atmospheric pressure. The plasma reactor is a cylindrical quartz-made reactor characterized in that its wall surface, serving as a solid dielectric member (insulator), provokes dielectric barrier discharge.

2) A high-voltage electrode according to this embodiment includes a hydrogen separation membrane and a support member that supports the hydrogen separation membrane. Examples of the hydrogen separation membrane are palladium alloy membranes, zirconium-nickel (Zr—Ni)-based alloy membranes, vanadium-nickel (V—Ni)-based alloy membranes, niobium-nickel (Nb—Ni)-based alloy membranes, and alloy membranes made from at least one metal selected from the group consisting of niobium (Nb), nickel (Ni), cobalt (Co), and molybdenum (Mo), and at least one metal selected from the group consisting of vanadium (V), titanium (Ti), zirconium (Zr), tantalum (Ta), and hafnium (Hf). The palladium alloy membranes are particularly preferable examples of the hydrogen separation membrane according to this embodiment. The hydrogen separation membrane may be a single membrane made from a metal selected from the before-mentioned metals. The hydrogen separation membrane may be a laminate of two metals selected from the before-mentioned metals. The hydrogen separation membrane may be selected from non-metal hydrogen separation membranes such as silica-based separation membranes, zeolite-based separation membranes, polyimide separation membranes, and polysulfone separation membranes, in which case the support member that supports any of these separation membranes is a metallic member with pores suitably formed therein.

3) A hydrogen generating method using the hydrogen generating apparatus according to this embodiment includes steps of: supplying the ammonia gas from the gas supply unit at a flow rate and a concentration suitably controlled; regulating a frequency of and a voltage applied by the high-voltage pulse power supply to the high-voltage electrode based on the flow rate and the concentration of the ammonia gas supplied by the gas supply unit; generating atmospheric non-equilibrium ammonia plasma in the plasma reactor by provoking electric discharge between the hydrogen separation membrane of the high-voltage electrode and the grounding electrode; transmitting hydrogen gas generated from the atmospheric non-equilibrium ammonia plasma through the hydrogen separation membrane to separate the hydrogen; and purging a nitrogen gas generated from the atmospheric, non-equilibrium ammonia plasma off the hydrogen generating apparatus.

4) In the atmospheric non-equilibrium ammonia plasma, reactions expressed by the following reaction formulas are generated.

$$NH_3 + e \rightarrow N + H + H_2 + e \quad \text{(reaction formula 1)}$$

$$H + H \rightarrow H_2 \quad \text{(reaction formula 2)}$$

$$N + N \rightarrow N_2 \quad \text{(reaction formula 3)}$$

$$N + 3H \rightarrow NH_3 \quad \text{(reaction formula 4)}$$

Figure 2:
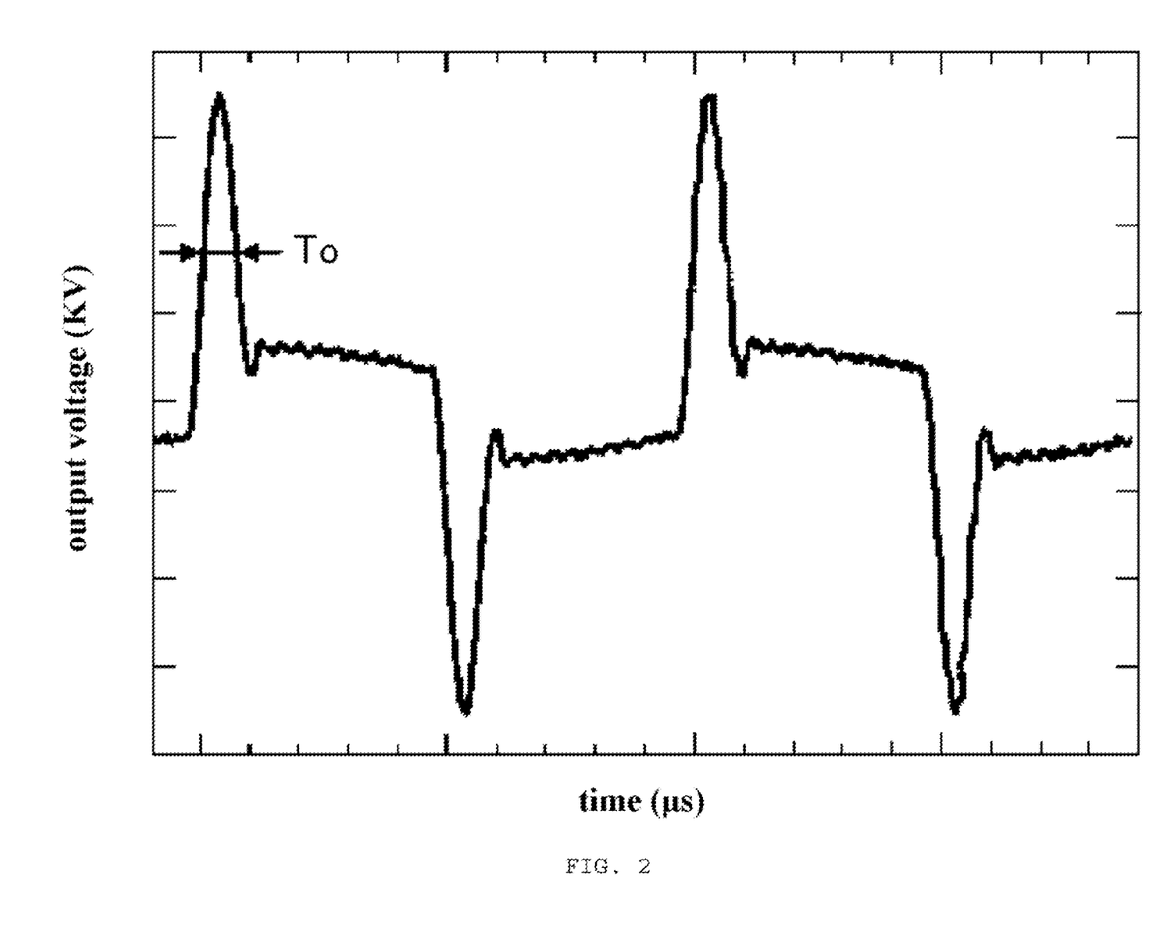
FIG. 2 is a way form chart of voltages applied to a high-voltage electrode from a high-voltage pulse power supply.

The reaction formula 1 expresses the state of decomposed ammonia in plasma state. FIG. 2 expresses the generation of hydrogen from recombined hydrogen radicals (H). The reaction formula 3 expresses the generation of nitrogen from recombined nitrogen radicals (N). The reaction formula 4 expresses the regeneration of ammonia. Without the hydrogen separation membrane, ammonia is unavoidably regenerated at a certain ratio as expressed by the reaction formula 4. According to this embodiment, hydrogen generated through the hydrogen separation membrane is immediately guided into the internal chamber on the inner side of the hydrogen separation membrane. Therefore, the regeneration of ammonia hardly occurs, and the hydrogen contained in the ammonia is ultimately 100% extractable in the form of hydrogen gas.

EXAMPLES

Specific examples of the hydrogen producing apparatus and the fuel cell system according to the embodiment are hereinafter described referring to the accompanying drawings.

Example 1

A hydrogen generating apparatus for generating hydrogen from ammonia and a hydrogen generating method using the hydrogen generating apparatus are hereinafter described referring to FIGS. 1 to 4. A hydrogen generating apparatus 1 illustrated in FIG. 1 includes a plasma reactor 3, a high-voltage electrode 5, a grounding electrode 7, and a gas supply unit 15.

Figure 1:
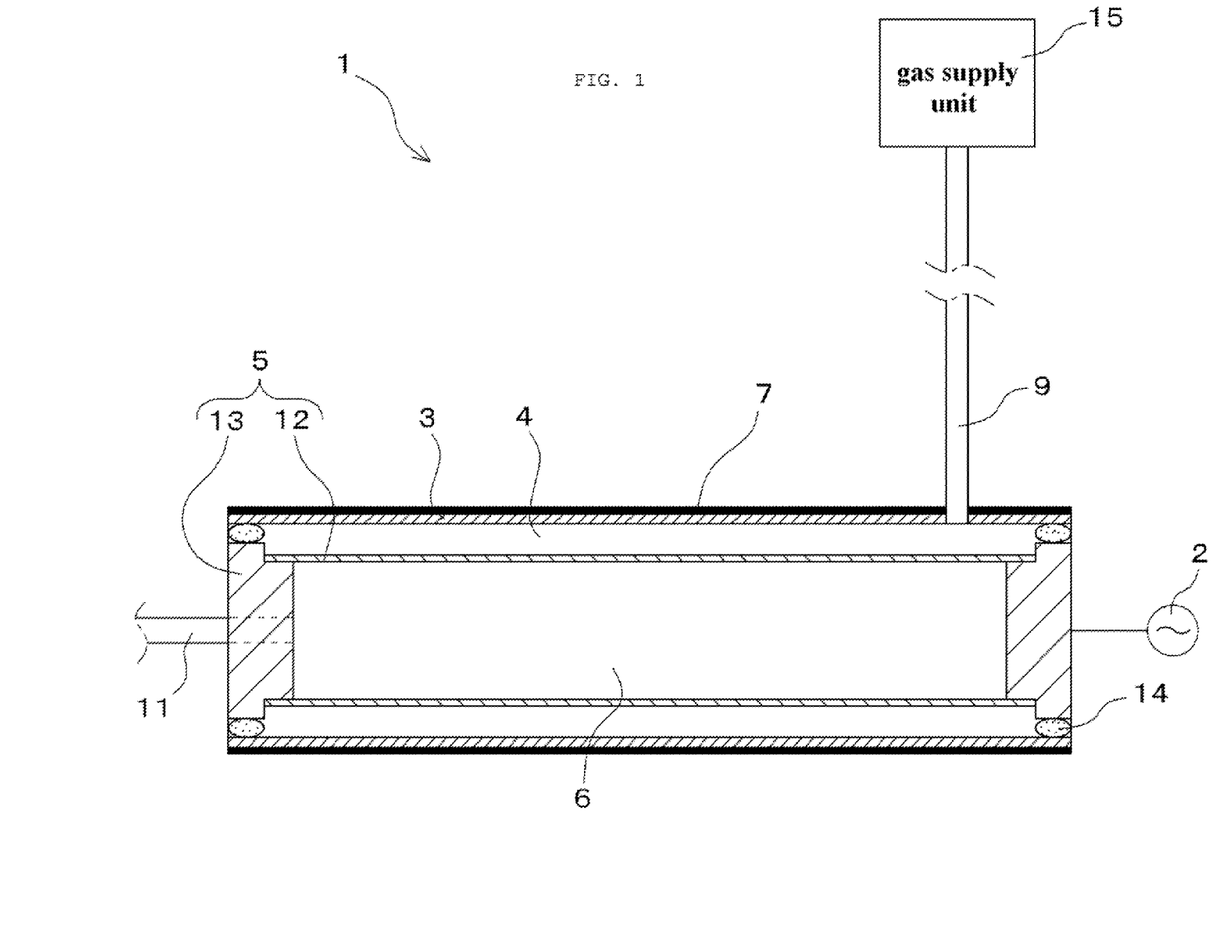
FIG. 1 is a vertical sectional view schematically illustrating the structure of a hydrogen generating apparatus 1 according to an embodiment of the invention.

The plasma reactor 3 is a cylindrical quartz-made reactor. A high-voltage electrode 5 is provided in the plasma reactor 3. The high-voltage electrode 5 includes a hydrogen separation membrane 12 and a disc-shaped support member 13 that supports the hydrogen separation membrane 12 at both ends thereof. The high-voltage electrode 5 is connected to a high-voltage pulse power supply 2, and a high voltage is applied to the high-voltage electrode 5. According to this example, the hydrogen separation membrane 12 is formed of a palladium alloy membrane. An O ring 14 is fitted in between the plasma reactor 3 and the support member 13 so that the hydrogen separation membrane 12 is located concentric to the inner wall of the plasma reactor 3. These structural features form a discharge space 4 between the inner wall of the plasma reactor 3 and the hydrogen separation membrane 12, providing a uniform interval therebetween along their whole lengths. There is an internal chamber 6 formed on the inner side of the hydrogen separation membrane 12. The internal chamber 6 is a closed space surrounded by the hydrogen separation membrane 12 and the support member 13.

The outer diameter of the plasma reactor 3 is 45 mm, and the length thereof is 490 mm. The interval between the inner wall of the plasma reactor 3 and the hydrogen separation membrane 12 is 1.5 mm.

A grounding electrode 7 in contact with the outer side of the plasma reactor 3 is located concentric to the hydrogen separation membrane 12 in a manner that faces the hydrogen separation membrane 12. The hydrogen separation membrane 12 and the grounding electrode 7 are facing each other, and the quartz-made plasma reactor 3 is interposed therebetween. The plasma reactor accordingly functions as a dielectric member, and a high voltage applied to the hydrogen separation membrane 12 provokes dielectric barrier discharge.

A gas supply passage 9 communicates the gas supply unit 15 and the discharge space 4 with each other to supply an ammonia-containing gas from the gas supply unit 15 into the discharge space 4. The gas supply unit 15 includes a gas tank that stores therein the gas to be supplied to the plasma reactor 3, to gas mixing unit with valves such as motorized valves, and a control unit that controls the flow rate of the supplied gas while at the same time measuring the pressure and composition of the supplied gas. In this example, the gas supplied from the gas supply unit 15 is a 100% ammonia gas. The gas supply unit 15 can supply, as well as the 100% ammonia gas, mixed gases containing ammonia and inactive gases such as nitrogen gas.

The high-voltage pulse power supply 2 is located outside oldie plasma reactor 3 and applies a high voltage to the high-voltage electrode 5. FIG. 2 illustrates a voltage waveform of voltages applied by the high-voltage pulse power supply 2 to the high-voltage electrode 5 in this example. The voltage waveform of FIG. 2 having a very short waveform retention time $T_O$, 10 μs, is characterized by a high electron energy density and low power consumption.

The hydrogen producing method using the hydrogen generating apparatus 1 according to this example includes first through fourth steps. The first step is a step of supplying the ammonia gas from the gas supply unit 15 at a predetermined flow rate into the discharge space 4 through the gas supply passage 9. The second step is a step of regulating the frequency and the voltage of the high-voltage pulse power supply 2 based on the flow rate of the ammonia gas. The frequency of the pulse power supply 2 according to this example is 10 KHz. The third step is a step of generating dielectric barrier discharge between the grounding electrode 7 and the hydrogen separation membrane 12 of the high-voltage electrode 5 to generate atmospheric non-equilibrium ammonia plasma in the discharge space 4. The fourth step is a step of transmitting hydrogen gas generated from the atmospheric non-equilibrium ammonia plasma through the hydrogen separation membrane 12 and guiding the separated hydrogen into the internal chamber 6.

It normally requires temperatures between 400° C. and 500° C. to separate hydrogen through the hydrogen separation membrane 12 formed of a palladium alloy membrane according to this example. On the other hand, in the plasma reactor 3 according to this example, the hydrogen separation advances at high electron temperatures, approximately 10000° C. of the atmospheric non-equilibrium plasma. According to this example, hydrogen is separable through the hydrogen separation membrane 12 without applying 400° C.-500° C. heat from outside of the plasma reactor.

For transfer of the hydrogen gas from the discharge space 4 to the internal chamber 6 in the fourth step, the internal pressure oldie internal chamber 6 is set to a negative pressure via a pump, not illustrated in the drawings, installed in a hydrogen flow channel 11 connected to the internal chamber 6.

Figure 3:
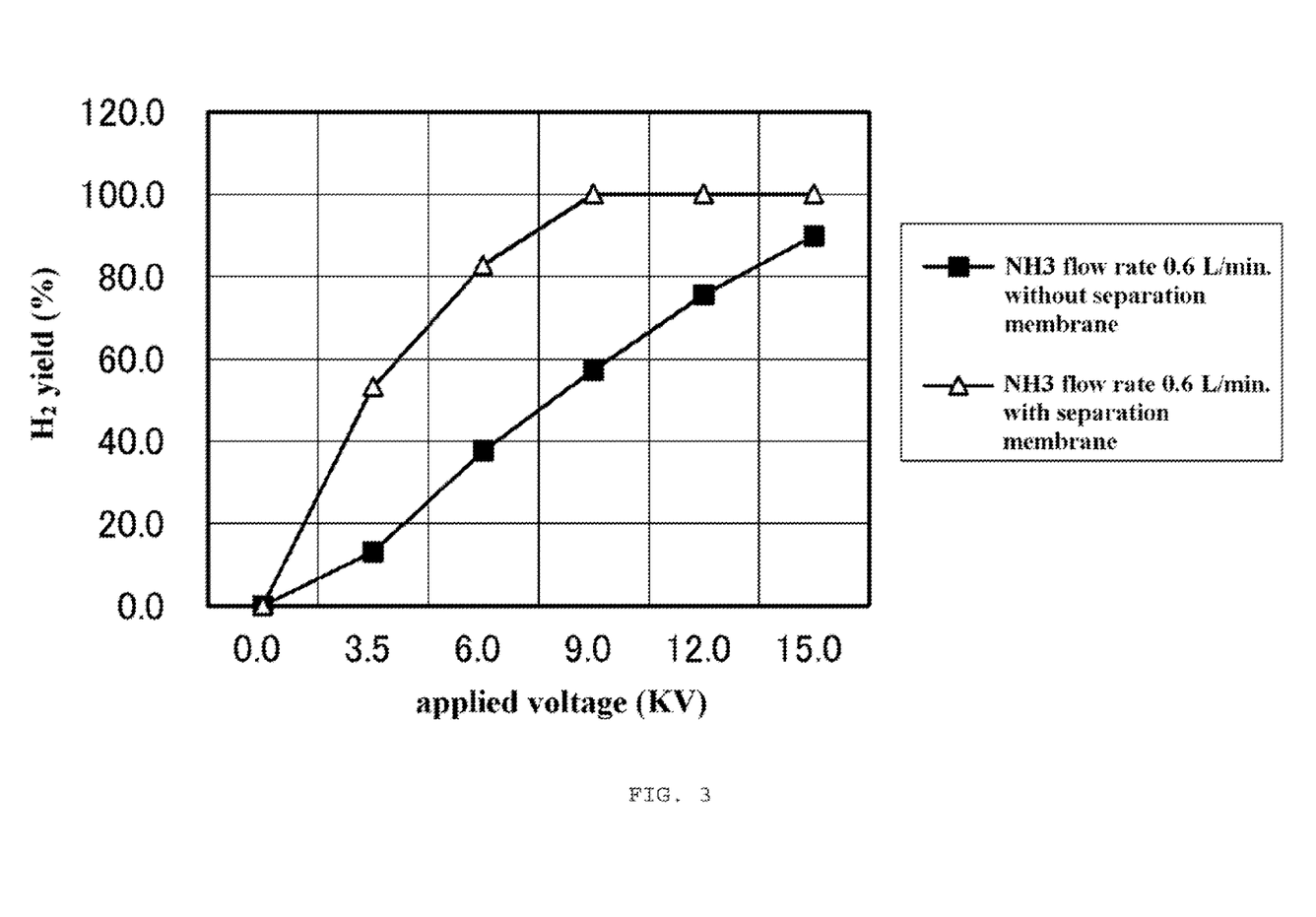
FIG. 3 is a graph showing different hydrogen yields with and without a hydrogen separation membrane of the high-voltage electrode when an ammonia gas flow rate was 0.6 L/min.

FIG. 3 is a graph illustrating a hydrogen yield variation when the flow rate of the ammonia gas supplied from the has supply unit 15 was 0.6 liter per minute (0.6 L/min.), and the applied voltage was 3.5 KV to 15.0 KV. The hydrogen yield is represented by a percentage (%) or ammonia-derived hydrogen calculated by a mathematical formula 1 based on the following reaction formula (formula 5) as below.

$$2NH_3 + e \rightarrow N_2 + 3H_2 + e \qquad \text{(formula 5)}$$

Hydrogen yield %=(3×molar flow rate of hydrogen at reactor outlet: mol/min.)÷(2×molar flow rate of ammonia at reactor inlet mol/min.)×100    Mathematical Formula 1

In the graph of FIG. 3, a line with white triangle marks shows the hydrogen yield obtained by the hydrogen producing apparatus 1 according to this example. The hydrogen yield increases with higher applied voltages. The hydrogen yield reached 100% when 9.0 kV or higher voltages were applied.

Figure 4:
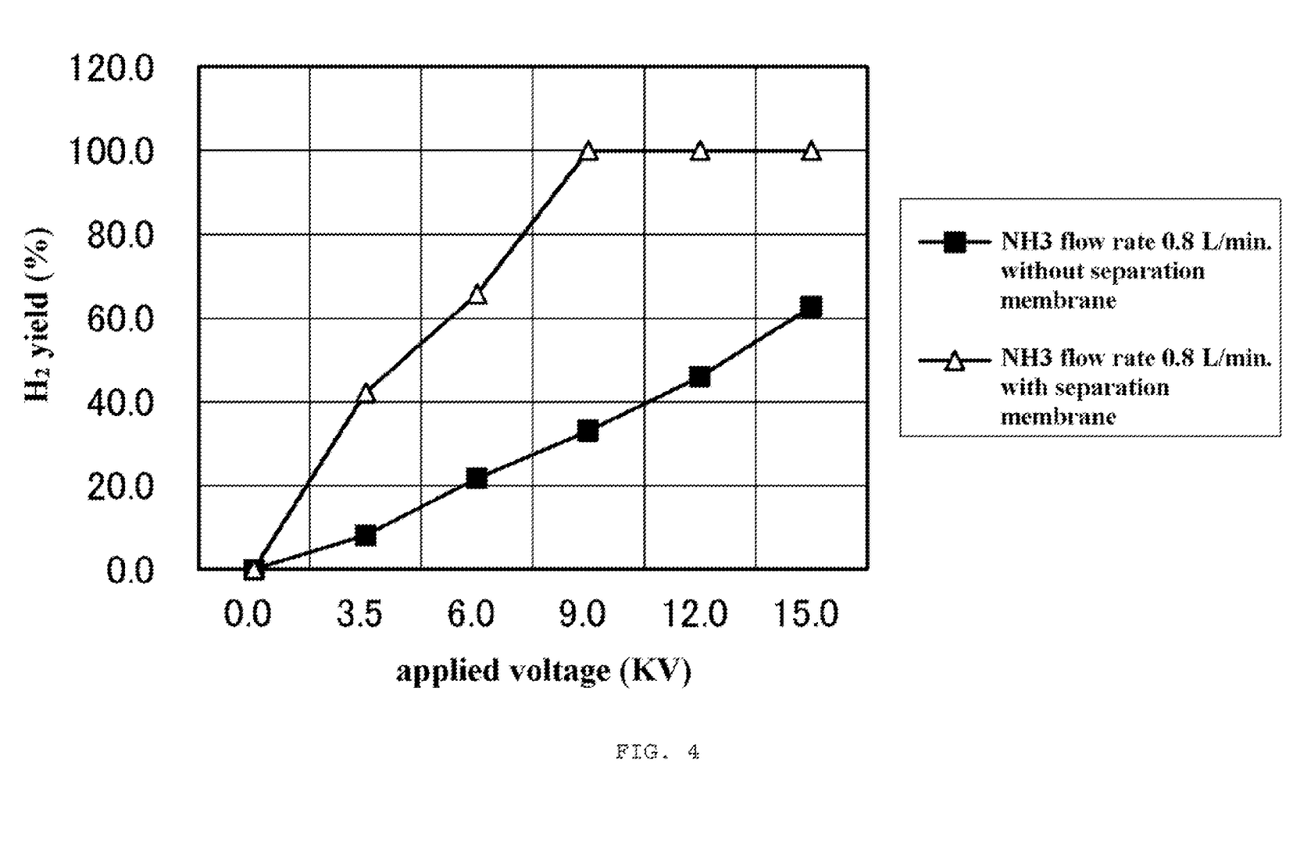
FIG. 4 is a graph showing different hydrogen yields with and without a hydrogen separation membrane of the high-voltage electrode when the ammonia gas flow rate was 0.8 L/min.

FIG. 4 is a graph illustrating a hydrogen yield variation when the flow rate of the ammonia gas supplied from the gas supply unit 15 was 0.8 liter per minute (0.8 L/min.), and the applied voltage was 3.5 KV to 15.0 KV. In the graph of FIG. 4, a line with white triangle marks shows the hydrogen yield obtained by the hydrogen producing apparatus 1 according to this example. As with the ammonia flow rate of 0.6 liter per minute, the hydrogen yield increases with higher applied voltages. The hydrogen yield reached 100% when 9.0 kV or higher voltages were applied. The yield obtained at the applied, voltages less than 9.0 kV was higher when the flow rate was 0.6 liter/min than that when the flow rate was 0.8 liter/min.

In the graphs of FIGS. 3 and 4 further illustrating comparative examples, lines with square marks each shows a hydrogen yield—applied voltage relationship when hydrogen was generated from ammonia gas by a plasma reactor with neither a hydrogen separation membrane in its high-voltage electrode nor an internal chamber. In the comparative example with the ammonia gas flow rate of 0.6 liter per minute, the hydrogen yield was 57.2% when the applied voltage was 9.0 kV, and 89.8% even at the applied voltage increased to 15.0 kV. In the comparative example with the ammonia gas flow rate was 0.8 liter per minute, the hydrogen yield was 33.0% when the applied voltage was 9.0 kV, and 62.7% even at the applied voltage increased to 15.0 kV.

The comparison between the comparative examples and the example 1 clearly demonstrates that the hydrogen yield from the ammonia gas is greatly improved by selectively guiding the hydrogen into the internal chamber 6 through the hydrogen separation membrane 12 provided in the high-voltage electrode 5. Such a remarkable effect is exerted because the hydrogen separated through the hydrogen separation membrane 12 can be immediately guided into the internal chamber 6 on the inner side of the hydrogen separation membrane 12 with hardly at chance of ammonia being regenerated, and hydrogen can be generated very efficiently. In this example, irrespective of the ammonia gas flow rate, the hydrogen contained in the ammonia is ultimately 100% extractable in the form of hydrogen was as far as an optimal applied voltage is selected. The energy efficiency in generating hydrogen according to the example 1 was 73.6 mol-H$_2$/kWh, which is significantly higher than the results with catalyst-mediated hydrogen producing methods.

As described so far in detail, the hydrogen generating apparatus 1 according to this example can continuously generate hydrogen from ammonia at room temperature and normal pressure (atmospheric pressure). The hydrogen generating apparatus 1 can generate hydrogen without using expensive catalysts. Such an apparatus can be inexpensively structured as compared to the prior art, and the hydrogen can accordingly be produced with lower cost. Further, this apparatus, wherein hydrogen is generated from ammonia transformed into plasma by electric discharge, can generate hydrogen at higher rates than generating hydrogen through catalytic reactions. The hydrogen generating apparatus 1 according to the example 1 is further advantageous in that the hydrogen contained in the source material, ammonia, is ultimately 100% extractable in the form of hydrogen gas. Therefore, an additional process for ammonia residue becomes unnecessary.

Example 2

Figure 5:
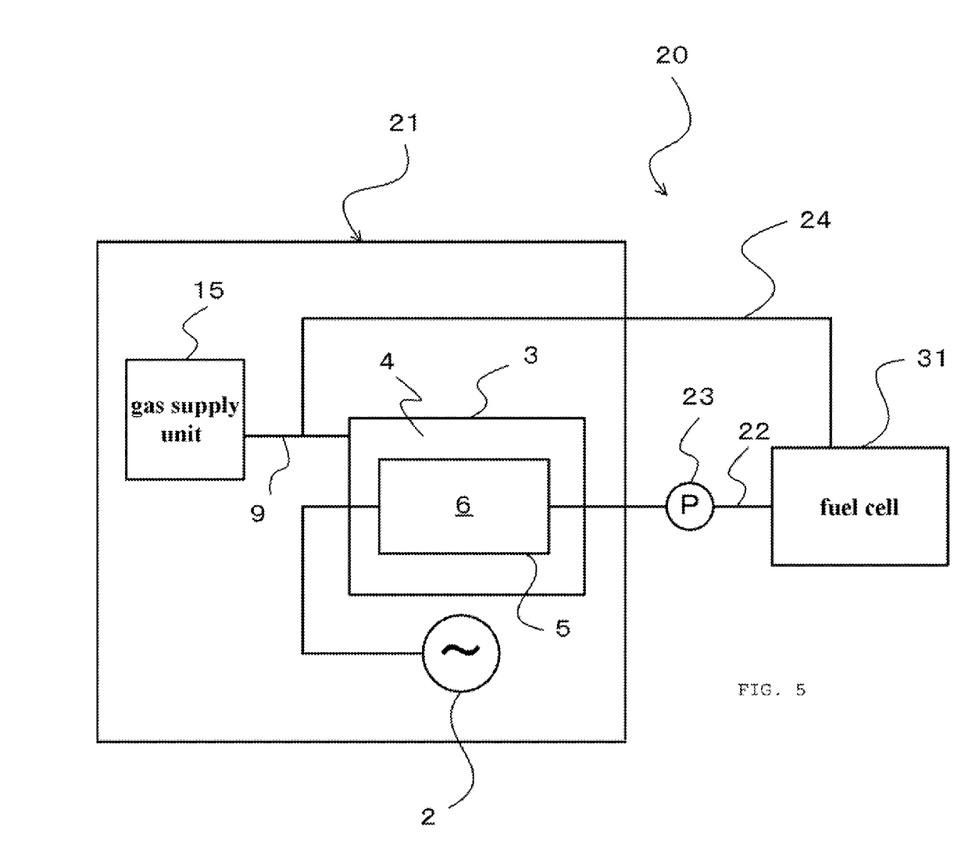
FIG. 5 is a schematic block diagram of a fuel cell system 30 according to the embodiment.

A fuel cell system 20 provided with a hydrogen generating apparatus 21 for generating hydrogen from ammonia and a fuel cell 31 are hereinafter described referring to FIG. 5. The hydrogen generating apparatus 21 of the fuel cell system 20 has a high-voltage pulse power supply 2, a plasma reactor 3, a discharge space 4, a high-voltage electrode 5, an internal chamber 6, a grounding electrode 7, and a gas supply unit 15. These devices of the apparatus are larger in size than the devices according to the example 1 but are functionally identical hereto. The devices, therefore, will not be redundantly described but are simply given the same reference symbols.

A hydrogen flow channel 22 communicates the internal chamber 6 formed inside of the high-voltage electrode 5 and the fuel cell 31 with each other. A pump 23 is installed in the hydrogen flow channel 22. The pump 23 starts to operate as soon as the hydrogen producing apparatus 1 is turned on, and suctions the gas from inside of the internal chamber 6. In the discharge space 4, hydrogen is generated from the source material, ammonia, supplied from the gas supply unit 15. The generated hydrogen passes through the hydrogen separation membrane 5 and flows into the internal chamber 6. Then, the hydrogen flows out of there into the hydrogen flow channel 22 and supplied to the fuel cell 31.

The fuel cell system 20 according to this example includes an off gas guiding channel 24 for guiding hydrogen off gas discharged from the fuel cell 31 into the discharge space 4 in the plasma reactor 3. Hydrogen contained in the hydrogen off gas guided through the off gas guiding channel 24 into the discharge space 4 passes through the hydrogen separation membrane 5 and then supplied to the fuel cell 31 by way of the internal chamber 6 and the hydrogen how channel 22. By thus separating hydrogen from the hydrogen off gas discharged from the fuel cell 31 and supplying the separated hydrogen to the fuel cell 31, this example can further improve power generation in efficiency and cost effectiveness.

The hydrogen generating apparatus and the fuel cell system described in this example can be optionally modified. For example, the gas supplied from the gas supply unit 15 is not necessarily limited to pure ammonia gas but may be one selected from mixed gases containing ammonia and inactive gases. The gas may be pure ammonia generated from liquid ammonia or urea, or one selected from mixed gas containing ammonia and inactive gases. In the event of an changes to the ammonia flow rate and/or distance between the high-voltage electrode and the grounding electrode, the applied voltage is suitably changed to achieve a hydrogen yield as good as those obtained in the examples.

INDUSTRIAL APPLICABILITY

The hydrogen generating apparatus according to the invention is advantageously applicable to decentralized electric power generation, emergency power generation, and fuel battery cars.

DESCRIPTION OF REFERENCE SYMBOLS 1 hydrogen producing apparatus
2 high-voltage pulse power supply
3 plasma reactor
4 discharge space
5 high-voltage electrode
6 internal chamber
7 grounding electrode
9 gas supply passage
11, 22 hydrogen flow channel
12 hydrogen separation membrane
15 gas supply unit
24 off gas guiding channel
31 fuel cell

The invention claimed is:
1. A hydrogen generating apparatus for generating hydrogen from ammonia, comprising:
a cylindrical plasma reactor;
a cylindrical high-voltage electrode having a first end and a second end, and being located on an inner side of the plasma reactor and connected to a high-voltage pulse power supply, wherein a disc-shaped support member is positioned at each end of the high-voltage electrode, the support members positioning the hydrogen separation membrane in concentric relationship with the plasma reactor;
a grounding electrode located at a position on an outer side of the plasma reactor in a manner that faces the high-voltage electrode; and
a gas supply unit operable to supply an ammonia-containing gas to the plasma reactor,
wherein the high-voltage electrode includes a hydrogen separation membrane which is shaped so as to define an internal chamber on an inner side thereof, a discharge space is formed between the plasma reactor and the hydrogen separation membrane, wherein the hydrogen separation membrane alone separates the internal chamber from the discharge space, such that one surface of the hydrogen separation membrane is exposed to the discharge space, and the opposite surface of the hydrogen separation membrane is exposed to the internal chamber, and the discharge space is empty of any solid structure, the hydrogen separation membrane functions as a high-voltage electrode with power, and the hydrogen separation membrane discharges electricity between the hydrogen separation membrane and the grounding electrode with power supplied from the high-voltage pulse power supply, inducing ammonia contained in the ammonia-containing gas supplied by the gas supply unit to transform into plasma to generate hydrogen.

2. The hydrogen generating apparatus as claimed in claim 1, wherein the plasma reactor has a cylindrical shape,
the high-voltage electrode includes a cylindrical hydrogen separation membrane located concentrically in the plasma reactor,
the gas supply unit is connected to the discharge space to supply the ammonia-containing gas,
the hydrogen separation membrane discharges electricity between the hydrogen separation membrane and the grounding electrode, and
the hydrogen separation membrane transmits therethrough the hydrogen generated in the discharge space and guides the hydrogen into the internal chamber.

3. A fuel cell system, comprising a fuel cell and a hydrogen generating apparatus, the hydrogen generating apparatus comprising:
a cylindrical plasma reactor;
a cylindrical high-voltage electrode having a first end and a second end, and including a hydrogen separation membrane, the hydrogen separation membrane being located on an inner side of the plasma reactor to form an internal chamber and connected to a high-voltage pulse power supply, wherein a disc-shaped support member is positioned at each end of the high-voltage electrode, the support members positioning the hydrogen separation membrane in concentric relationship with the plasma reactor;
a grounding electrode located at a position on an outer side of the plasma reactor in a manner that faces the high-voltage electrode;
a gas supply unit operable to supply an ammonia-containing gas into a discharge space formed between the plasma reactor and the high-voltage electrode, wherein the hydrogen separation membrane alone separates the internal chamber from the discharge space, such that one surface of the hydrogen separation membrane is exposed to the discharge space, and the opposite surface of the hydrogen separation membrane is exposed to the internal chamber, and the discharge space is empty of any solid structure; and
a hydrogen flow channel connected to the internal chamber of the high-voltage electrode,
wherein the hydrogen separation membrane functions as a high-voltage electrode with power, the hydrogen separation membrane discharges electricity between the hydrogen separation membrane and the grounding electrode, inducing ammonia contained in the ammonia-containing gas supplied from the gas supply unit to transform into plasma in the discharge space to generate hydrogen,
the hydrogen separation membrane transmits therethrough the generated hydrogen and guides the hydrogen into the internal chamber, and
the hydrogen guided to the internal chamber is then supplied through the hydrogen flow channel to the fuel cell.

4. The fuel cell system as claimed in claim 3, further comprising an off gas guiding channel for guiding hydrogen off gas discharged from the fuel cell into the plasma reactor, wherein the hydrogen separation membrane transmits therethrough the hydrogen contained in the hydrogen off gas guided into the plasma reactor to separate the hydrogen from the hydrogen off gas, and the hydrogen thus separated is supplied to the fuel cell.

* * * * *